United States Patent [19]

Brown et al.

[11] Patent Number: 5,422,974
[45] Date of Patent: Jun. 6, 1995

[54] SHOCK RESISTANT OPTIC FIBER ROTARY SPLICE HOLDING DEVICE

[75] Inventors: Gair D. Brown, Dahlgren; Alan C. Schwarting, Warsaw; Robert G. Aldous; Daniel D. Thomas, both of King George; Francis L. Needham, Fredericksburg; Sara M. Leite, Dahlgren, all of Va.

[73] Assignee: The United States of America as represented by the Secretary of the Navy, Washington, D.C.

[21] Appl. No.: 312,743

[22] Filed: Sep. 23, 1994

[51] Int. Cl.⁶ .......................... G02B 6/36; G02B 6/38
[52] U.S. Cl. ....................................... 385/135; 385/25; 385/52; 385/60; 385/95; 385/99; 385/134; 385/136; 385/137
[58] Field of Search ................ 385/15, 25, 31, 51, 385/52, 59, 60, 66, 72, 62, 78, 81, 83, 95, 97, 99, 134, 135, 136, 137, 139

[56] References Cited

U.S. PATENT DOCUMENTS

| | | |
|---|---|---|
| 4,807,957 | 2/1989 | de Jong et al. .............. 385/60 X |
| 4,884,863 | 12/1989 | Throckmorton .............. 385/135 X |
| 4,927,227 | 5/1990 | Bensel, III et al. .......... 385/135 X |
| 5,009,474 | 4/1991 | Wurmser et al. ............. 385/99 X |
| 5,097,529 | 3/1992 | Cobb et al. .................. 385/135 |
| 5,208,893 | 5/1993 | McCall et al. ............... 385/135 |
| 5,218,664 | 6/1993 | O'Neill et al. ............... 385/135 |
| 5,313,546 | 5/1994 | Toffetti ....................... 385/135 |
| 5,347,606 | 9/1944 | Johansen ..................... 385/95 |
| 5,367,591 | 11/1994 | Seike et al. .................. 385/51 |
| 5,367,594 | 11/1994 | Essert et al. ................. 385/70 |

Primary Examiner—Brian Healy
Attorney, Agent, or Firm—James B. Bechtel

[57] ABSTRACT

Rotary mechanical splices between axially aligned optic fibers are seated under axial compression within bays recessed into the body of a holding tray on which a retention lid is fastened in a position to which it is guided by fins on its underside received in grooves formed in the tray body. In such position of the lid on the tray, the lid underside surface covers access formations and the bays between the fins having portions covering fiber slots in the tray through which the optic fibers extend in alignment with their splices.

8 Claims, 3 Drawing Sheets

SHOCK RESISTANT OPTIC FIBER ROTARY SPLICE HOLDING DEVICE

BACKGROUND OF THE INVENTION

This invention relates generally to a protective holding device for optical fiber splices, and more particularly to a holding device designed to protectively enclose fiber splices of the rotary mechanical type.

Protective holding trays and other packaging devices for splices between optic fibers are already well known in the art. Generally, the splices form joints between optic fibers utilizing fusing or bonding techniques involving an adhesive, mechanical pressure or a combination thereof in combination with precision-machined alignment structure. Certain of such splicing arrangements may minimize the protective measures deemed necessary in the splice holding device or package for maintaining the integrity of the fiber splices in any contemplated installational environment.

A known splicing technique for directly aligning optic fibers, is associated with a rotary mechanical splice deemed suitable for connecting single-mode and multi-mode fibers. The optical losses may be minimized with such a rotary splice, despite its lack of precision-machined alignment structure, because of its rotatably adjusted fiber alignment capability. However, such rotary splices are susceptible to misalignment disturbances under harsh shock producing environments.

It is therefore an important object of the present invention to provide a protective holding device for splices between optic fibers of the rotary mechanical type that is shock resistant in order to maintain low optical loss under harsh environmental conditions.

SUMMARY OF THE INVENTION

In accordance with the present invention rotary mechanical splices, through which optical fibers are aligned and held in abutting contact with each other, are confined under axial compression within appropriately dimensioned bays recessed in the body of a holding tray also having fiber slots therein receiving the optical fibers extending from the splices in axial alignment therewith to prevent relative bending of the fibers. A retention lid, guidingly positioned on the holding tray and secured thereto by fasteners, rigidities the tray and covers the splice confining bays and the fiber receiving slots to enhance shock-resisting confinement of the splices and the fibers and prevent displacement thereof relative to the tray and lid. The tray and lid are made of relatively rigid material having the requisite shock-resisting properties, and also allow random access to a plurality of rotary splices for independent reconfiguration purposes.

BRIEF DESCRIPTION OF DRAWING FIGURES

A more complete appreciation of the invention and many of its attendant advantages thereof will be readily appreciated as the same becomes better understood by reference to the following detailed description when considered in connection with the accompanying drawings wherein.

Figure 1:
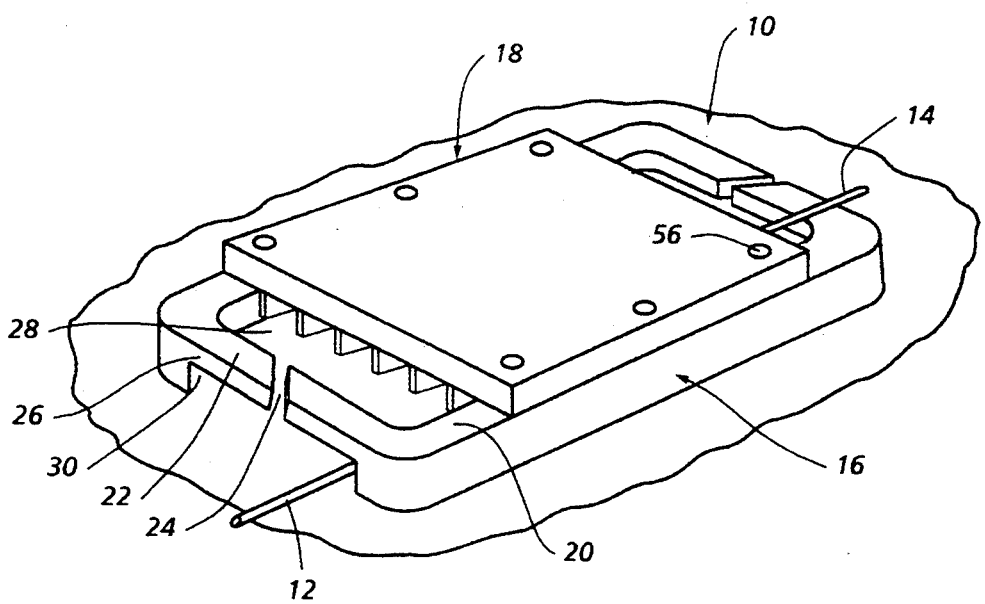
FIG. 1 is a perspective view of an assembled optic fiber spice holding device, in accordance with one embodiment of the invention, within which one of a plurality of splices is retained.
Figure 2:
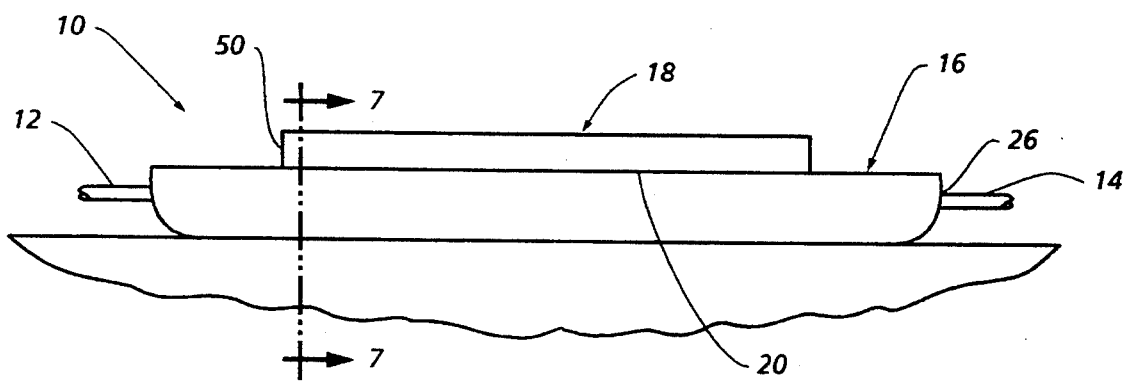
FIG. 2 is a side elevation view of the splice holding device shown in FIG. 1.
Figure 7:
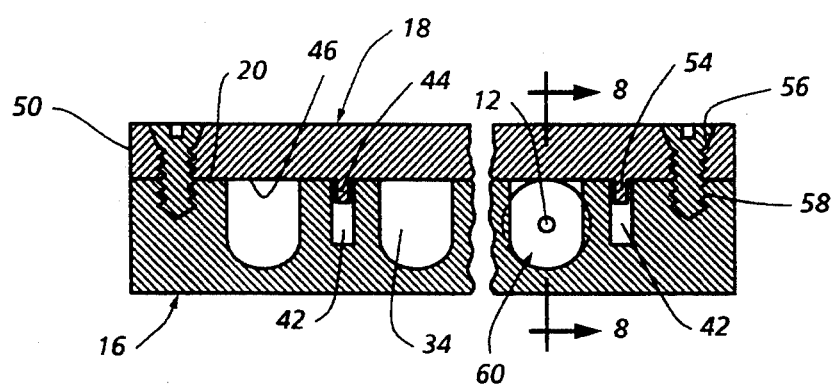
FIG. 7 is a partial side section view of the splice holding device, taken substantially through a plane indicated by section line 7—7 in FIG. 2.
Figure 8:
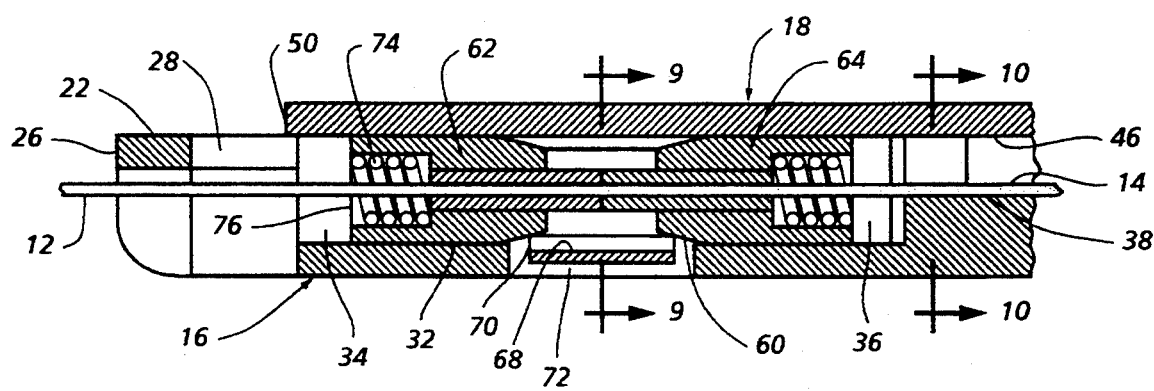
Figure 9:
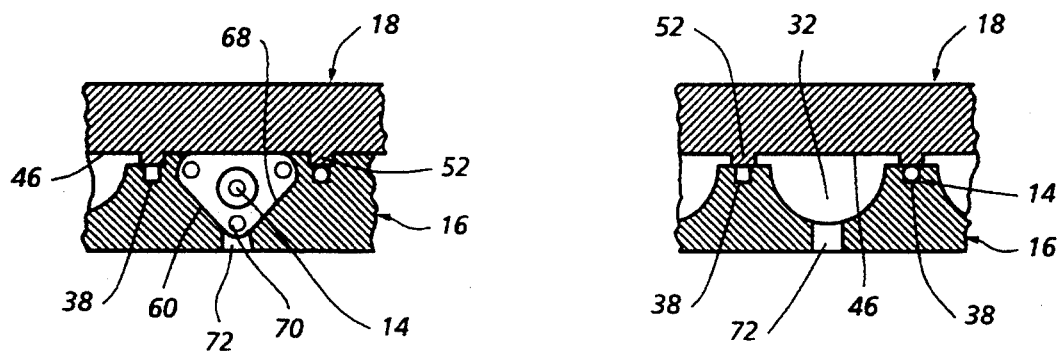
Figure 10:
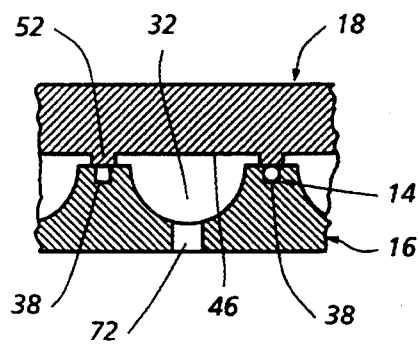

FIG. 8 is a partial longitudinal section view taken substantially through a plane indicated by section line 8—8 in FIG. 7, depicting a typical splice of the rotary mechanical type seated within the splice holding device shown in FIGS. 1 and 2; and FIGS. 9 and 10 are partial side section views respectively taken substantially through planes indicated by section lines 9—9 and 10—10 in FIG. 8.

DETAILED DESCRIPTION OF PREFERRED EMBODIMENT

Referring now to the drawing in detail, FIGS. 1 and 2 illustrate a holding device generally referred to by reference numeral 10, within which a splice between a pair of optical fibers 12 and 14 is protectively retained. As many as twelve of such splices may be accommodated within the device 10 in the illustrated embodiment, as will be explained hereinafter. The device 10 comprises basically two parts in the form of a holding tray generally referred to by reference numeral 16 and a retention lid 18. The materials from which the tray 16 and lid 18 are made is selected from metals or plastics that are hard or fiber reinforced to exhibit small deformations under stress in order to provide the desired shock-resisting confinement of the splices.

Figure 3:
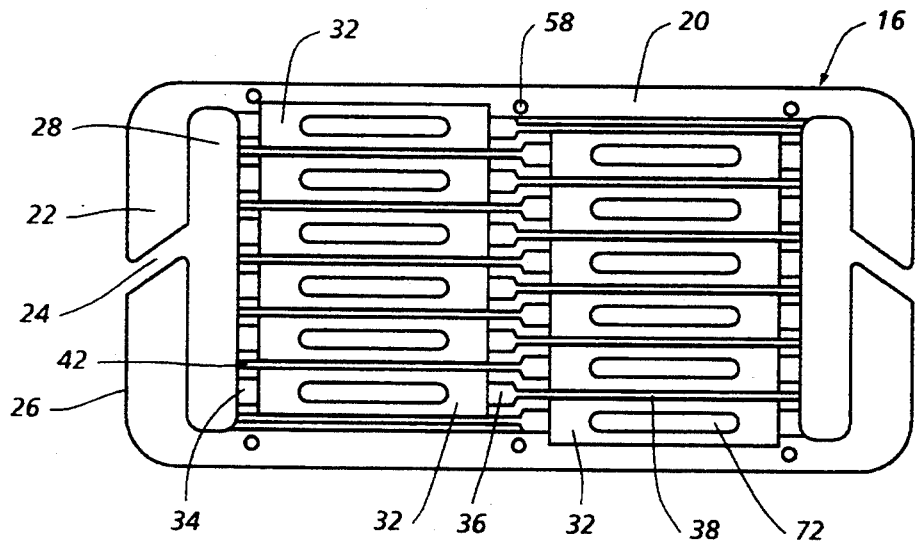
FIG. 3 is a top plan view of the disassembled tray part of the splice holding device shown in FIGS. 1 and 2.
Figure 4:
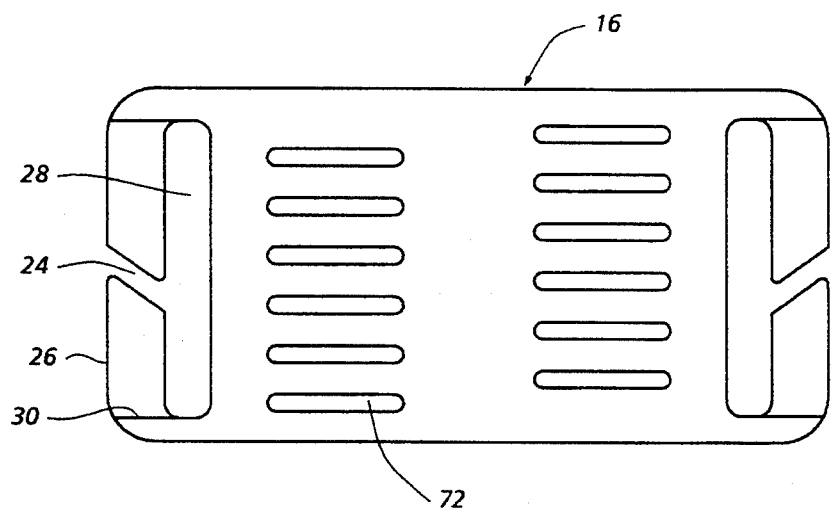
FIG. 4 is a bottom plan view of the tray shown in FIG. 3.

The holding tray 16 as shown in FIGS. 3 and 4 is generally rectangular in shape and has on its upper planar surface, parallel spaced side portions 20 interconnected by end portions 22 framing an intermediate recessed portion of the tray body as hereinafter described. Angled slots 24 are formed in the end portions 22 between end edges 26 and transverse openings 28 extending between the side portions 20 of the tray. The lid. 18 is supported on the tray between the openings 28 by the side surface portions 20 so as to cover the recessed portion of the tray body into which the optical fibers 12 and 14 extend through downwardly opening end cut outs 30 as more clearly seen in FIGS. 1, 4 and 5. The recessed portion of the tray body covered by the lid 18 accommodates organization of rotary mechanical splices between pairs of the optical fibers 12 and 14 and firm seating thereof so as to resist shock force induced disturbances, prevent bending of the fibers, reduce optical losses and otherwise protect the splices as hereinafter explained in detail.

Figure 5:
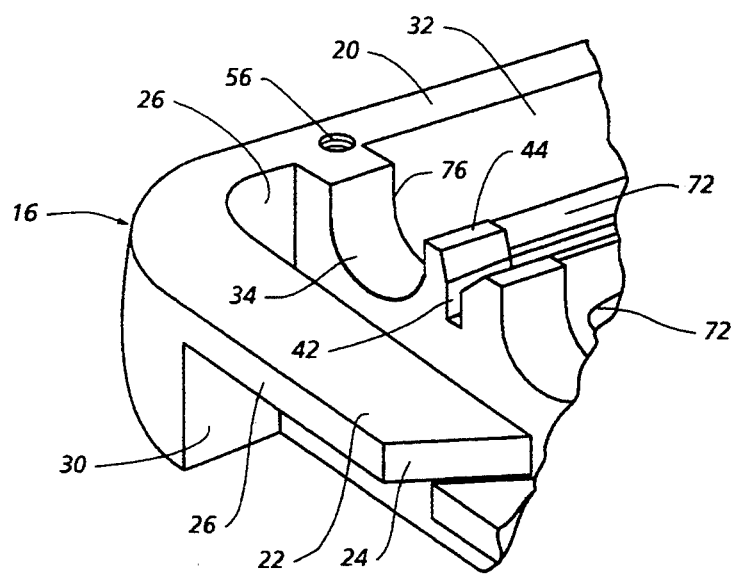
FIG. 5 is an enlarged perspective view of a portion of the tray shown in FIGS. 3 AND 4.

As shown in FIGS. 3 and 5, the recessed portion of the tray body between the lid supporting surface portions 20 and the openings 28 include twelve elongated bays 32. Each bay 32 is spaced at one longitudinal end from one of the openings 28 by an access recess 34. At the other end of each bay, it is spaced from a centerline of the tray body by another access recess 36 from which a fiber slot 38 extends to the other of the openings 28. All of the bays 32 respectively extend laterally between a pair of the fiber slots 38 or one fiber slot and a side surface portion 20. At the longitudinal ends of each bay 32, the fiber slots 38 are aligned with tapered grooves 42 between the access slot formations 34 and 36. Such grooves 42 are formed in the tray body slightly narrower at their lower ends than the fiber slots 38, but diverge upwardly therefrom toward edges 44 at the top of the tray body in the same surface plane as the supporting surface portions 20, as more clearly seen in FIG. 5.

Figure 6:
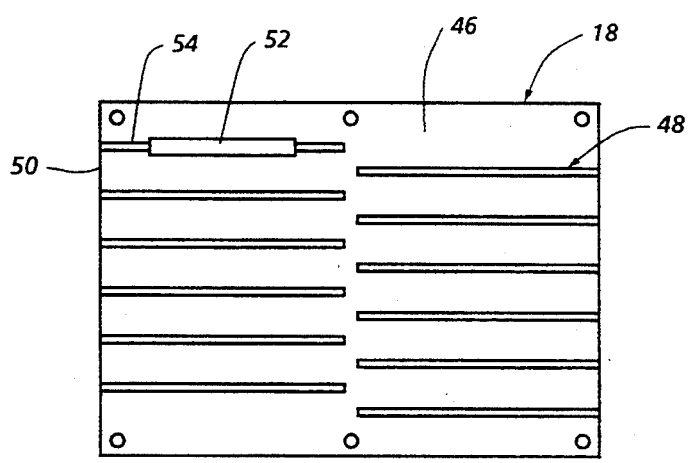
FIG. 6 is a bottom plan view of the disassembled retention lid part of the splice holding device shown in FIGS. 1 and 2.

The lid 18 on its underside surface 46, as shown in FIG. 6, has twelve fins 48 extending parallel to each other from the end edges 50 of the lid to locations closely spaced from the centerline. The fins 48 are laterally spaced from each other so as to be simultaneously aligned longitudinally with the bays 32 on each side of the centerline and their corresponding aligned fiber slots 38 on the other side of the centerline. The fins 48 project into the grooves 42 when the lid 18 is properly positioned on the holding tray 16. Each fin 48 includes a wider intermediate portion 52 adapted to cover the fiber slots 38, as shown in FIGS. 9 and 10, and a narrower guide portion 54 adapted to be received in the grooves 42 as shown in FIG. 7. The lid is accordingly positioned on the tray by insertion of the guide fins 48 into the grooves 42 for support on the side surface portions 20 and edges 44 between the grooves 42 thereby covering all of the bays 32, access recesses 34 and 36 and the fiber slots 38 as shown in FIGS. 7, 9 and 10. In such position of the lid on the tray, the lid is secured in place by screw fasteners 56 extending therefrom into aligned threaded bores 58 formed in the side portions 20 of the tray adjacent opposite longitudinal ends and at the centerline of the tray as shown in FIGS. 3, 5 and 7.

Referring now to FIGS. 8 and 9 in particular, seated within one of the bays 32, into which the optical fibers 12 and 14 extend, is a rotary mechanical type of splice generally referred to by reference numeral 60. This type of splice 60, generally known in the art, includes two transparent ferrules 62 and 64 respectively positioning tubular coatings 66 for the fibers within a berillium-bronze alignment clip 68 having three rods 70 through which the ferrules 62 and 64 are secured to each other after relative rotational adjustment centering the fibers in their aligned positions in contact with each other. The alignment clip 68 projects into a slot 72 formed in the bottom of each bay 32, which thereby accommodates reception of the rotary type of splice 60 and adjustment thereof to its seated position under axial compression of its end springs 74 in engagement with shoulder surfaces 76 formed between the access slot formation 34 or 36 and the bay 32 at its opposite longitudinal ends. In such adjusted position of the splice 60, the optical fiber 14 is seated in longitudinal alignment with the splice within a fiber slot 38 and retained therein by the wider portion 52 of a fin 48 projecting from the undersurface 46 of the lid, as more clearly seen in FIGS. 8 and 10. Microbending of the fibers 12 and 14 relative to the seated splice is thereby resisted.

It will be apparent from the foregoing description that as many as twelve rotary mechanical splices 60 between pairs of fibers 12 and 14 may be organized and properly seated under axial compression of their springs 74 within the bays 32, dimensionally shortened longitudinally to maximize the axial spring pressure firmly holding the splices confined in their rotationally adjusted positions with the aligned fibers received in the fiber slots 38 to prevent relative bending. The body of the tray 16 under and around the splices 60 seated within the bays 32 is furthermore dimensioned to provide a more robust shock-resisting environment, especially in view of the rigidity added to the tray by its attachment to the lid 18. Lateral movement of the alignment clips 68 of the splices with fin the bays 32 is also prevented by the undersurface 46 of the lid 16 covering the bays 32 and access slots 34 and 36 between the fins 48, while the wider portions 52 of the fins cover the fiber slots 38 to prevent displacement of the fibers therefrom under shock forces. The end portions 54 of the fins furthermore guide proper placement of the lid onto the tray by insertion into the tapered grooves 42 between the access recesses 34 and 36 from which the fibers extend externally of the tray.

Obviously other modifications and variations of the present invention may be possible in light of the foregoing teachings. It is therefore to be understood that within the scope of the appended claims the invention may be practiced otherwise than as specifically described.

What is claimed is:

1. In combination with rotary splices respectively having an alignment clip axially spacing a pair of rotationally adjusted ferrules through which optical fibers extend into contact with each other within the alignment clip, a protective shock-resisting holding device for said rotary splices comprising: a tray and a retention lid, said tray having recess means formed therein within which the rotary splices are seated for physical confinement under axial compression, slot means formed in the tray in axial alignment with said recess means for preventing relative bending of the optical fibers extending from the rotary splices, and means for guiding displacement of the retention lid to a position on the tray preventing movement of the optical fibers and the alignment clips of the splices within the slot means and the recess means, respectively.

2. The combination of claim 1 wherein said recess means includes an elongated bay into which one of the rotary splices is inserted and a pair of access portions axially spaced from each other by said elongated bay to form shoulders in axial abutment with said one of the rotary splices seated in the elongated bay, an axially extending slot being formed in the bay through which the alignment clip of the seated rotary splice projects.

3. The combination of claim 2 wherein said means for guiding displacement of the retention lid includes a pair of grooves formed in the tray in laterally spaced relation to the recess means and a plurality of fins projecting from the retention lid into the tray, two of said fins extending into said pair of grooves and a third of said fins extending in overlying relation to the slot means enclosing one of the optical fibers therein.

4. The combination of claim 1 wherein said means for guiding displacement of the retention lid includes a pair of grooves formed in the tray in laterally spaced relation to the recess means and a plurality of fins projecting from the retention lid into the tray, two of said guide fins extending into said pair of grooves and a third of said guide fins extending into contact with the tray in overlying relation to the slot means enclosing one of the optical fibers therein.

5. A protective enclosure for rotary splices into which optical fibers extend, comprising: a holding tray and a retention lid, said holding tray having recess means formed therein for confinement of the rotary splices under axial compression and slot means receiving the optical fibers in axial alignment with the recess means for preventing relative bending of the optical fibers extending from the rotary splices while seated in the recess means.

6. The combination as defined in claim 5 wherein said recess means includes an elongated bay portion into which one of the rotary splices is inserted and a pair of access portions axially spaced from each other by said elongated bay portion to form shoulders in axial abutment with said one of the rotary splices seated in the elongated bay portion.

7. The combination as defined in claim 6 including a pair of grooves formed in the holding tray in laterally spaced relation to the recess means and a plurality of guide fins projecting from the retention lid into the holding tray, two of said guide fins extending into said pair of grooves and a third of said guide fins extending into contact with the tray in overlying relation to the slot means enclosing said one of the optical fibers therein.

8. The combination as defined in claim 5 including a pair of grooves formed in the holding tray in laterally spaced relation to the recess means and a plurality of guide fins projecting from the retention lid into the holding tray, two of said guide fins extending into said pair of grooves and a third of said guide fins extending into contact with the tray in overlying relation to the slot means enclosing said one of the optical fibers therein.

* * * * *